United States Patent [19]
Jones et al.

[11] Patent Number: 5,280,999
[45] Date of Patent: Jan. 25, 1994

[54] LINEAR SEAT BACK RECLINER

[75] Inventors: William H. Jones, Rochester; Les Griswold, Ann Arbor, both of Mich.

[73] Assignee: Hoover Universal, Inc., Plymouth, Mich.

[21] Appl. No.: 999,351

[22] Filed: Dec. 31, 1992

[51] Int. Cl.⁵ .................................. B60N 2/02
[52] U.S. Cl. ...................... 297/361.1; 297/354.12
[58] Field of Search ............. 297/361, 363, 354, 355

[56] References Cited

U.S. PATENT DOCUMENTS

| | | | |
|---|---|---|---|
| 2,018,825 | 10/1935 | Wood | 297/355 X |
| 2,018,828 | 10/1935 | Bell | 297/361 |
| 3,127,788 | 4/1964 | Martens | 297/355 X |
| 3,350,135 | 10/1967 | Martens | 297/355 |
| 4,291,914 | 9/1981 | Mizelle | 297/361 |
| 4,630,866 | 12/1986 | McFarlane | 297/354 X |
| 4,759,587 | 7/1988 | Bucka | 297/355 X |
| 4,881,775 | 11/1989 | Rees | 297/361 |

Primary Examiner—Peter M. Cuomo
Assistant Examiner—Jerry Redman
Attorney, Agent, or Firm—Harness, Dickey & Pierce

[57] ABSTRACT

A linear seat rack recliner is disclosed having a lead screw mounted to a seat frame for rotation about its axis and a drive nut carried by the seat back frame movable along the lead screw upon rotation of the screw. A locking gear/thrust disk is fixed to the lead screw with a cam actuated locking pawl engageable with the gear to lock the gear in lead screw in position. The lead screw is also mounted for axial movement upon high loading with one face of the lock gear/thrust disk engaging a fixed wall surface to frictionally lock the gear and lead screw from rotation.

8 Claims, 2 Drawing Sheets

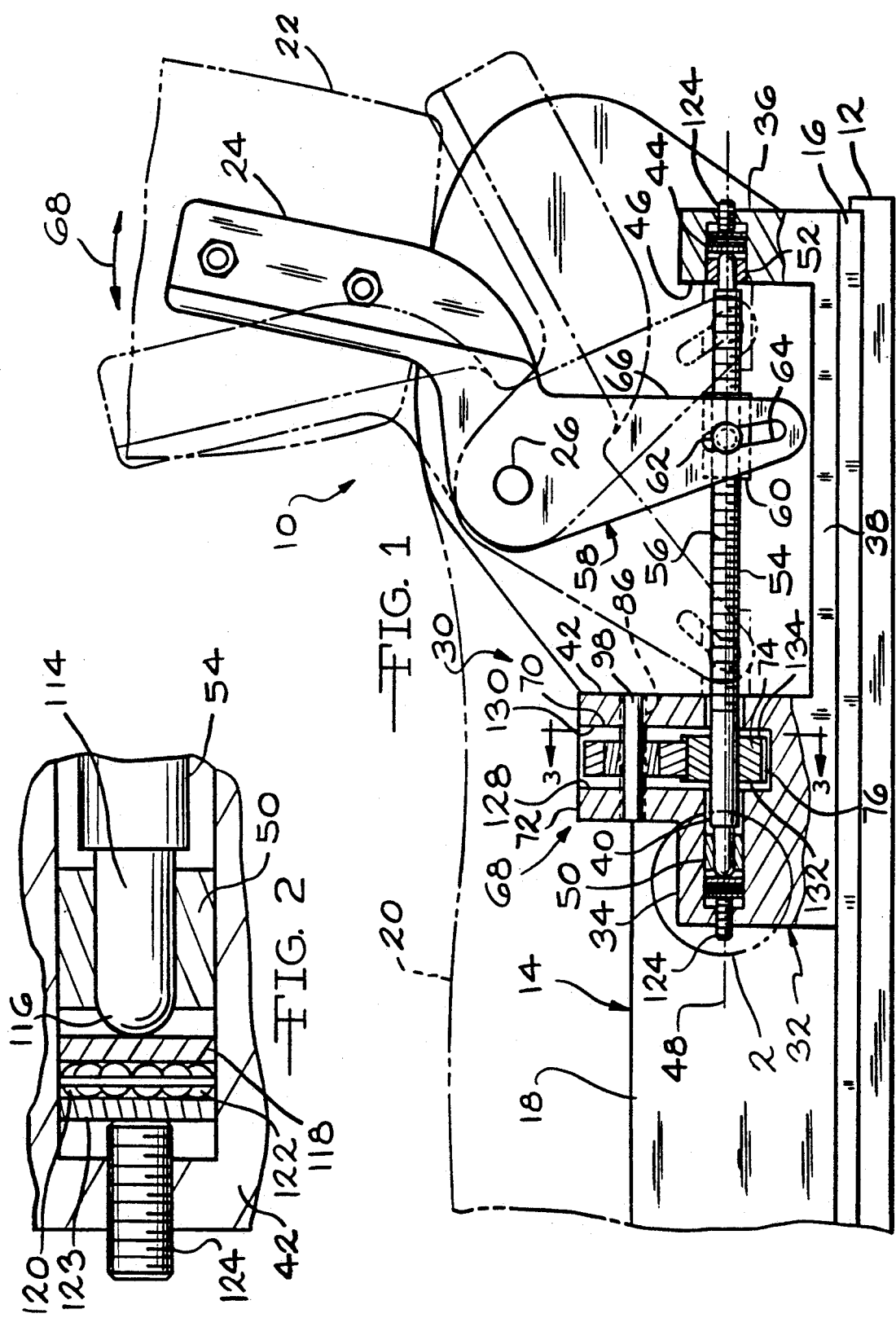

LINEAR SEAT BACK RECLINER

BACKGROUND AND SUMMARY OF THE INVENTION

The present invention relates to a recliner mechanism for a vehicle seat assembly and in particular to a manually actuated recliner mechanism having an infinitely variable lead screw with a cam actuated pawl for locking the recliner mechanism in a given position.

The seat back of the present invention has a recliner arm extending downwardly from the seat back pivot point. The lower end of the recliner arm carries a internally threaded nut that is threaded onto a fore and aft extending lead screw. Upon axial loading applied to the nut by the recliner arm, the lead screw will rotate about its axis translating the nut therealong. A locking gear is fixed to the lead screw and selectively engageable with a pawl to prevent rotation of the lead screw and therefore, pivoting of the seat back.

A rotating cam engages the pawl to hold the pawl in a lock position. Upon rotation of the cam, the pawl is moved out of engagement with the locking gear to permit the gear and the lead screw to rotate, causing translation of the nut along the screw, effecting angular adjustment of the seat back.

The lead screw is mounted for axial movement when axial forces above a predetermined value are applied to the screw by the nut. Upon such movement, one of the gear end faces will contact a confronting wall surface where friction between the gear and wall will prevent rotation of the gear and screw. As the axial force increase, so does the friction force. The friction force resisting rotation is more than the rotational force created by the helical threads of the screw. As a result, the mechanism is self locking under loading.

Further objects, features and advantages of the invention will become apparent from a consideration of the following description and the appended claims when taken in connection with the accompanying drawings.

BRIEF DESCRIPTION OF THE DRAWINGS

FIG. 1 is a side elevational view of the recliner mechanism of the present invention;

FIG. 2 is an enlarged view of one end of the lead screw shown in the circle 2 of FIG. 1.

DETAILED DESCRIPTION OF THE INVENTION

Figure 3:
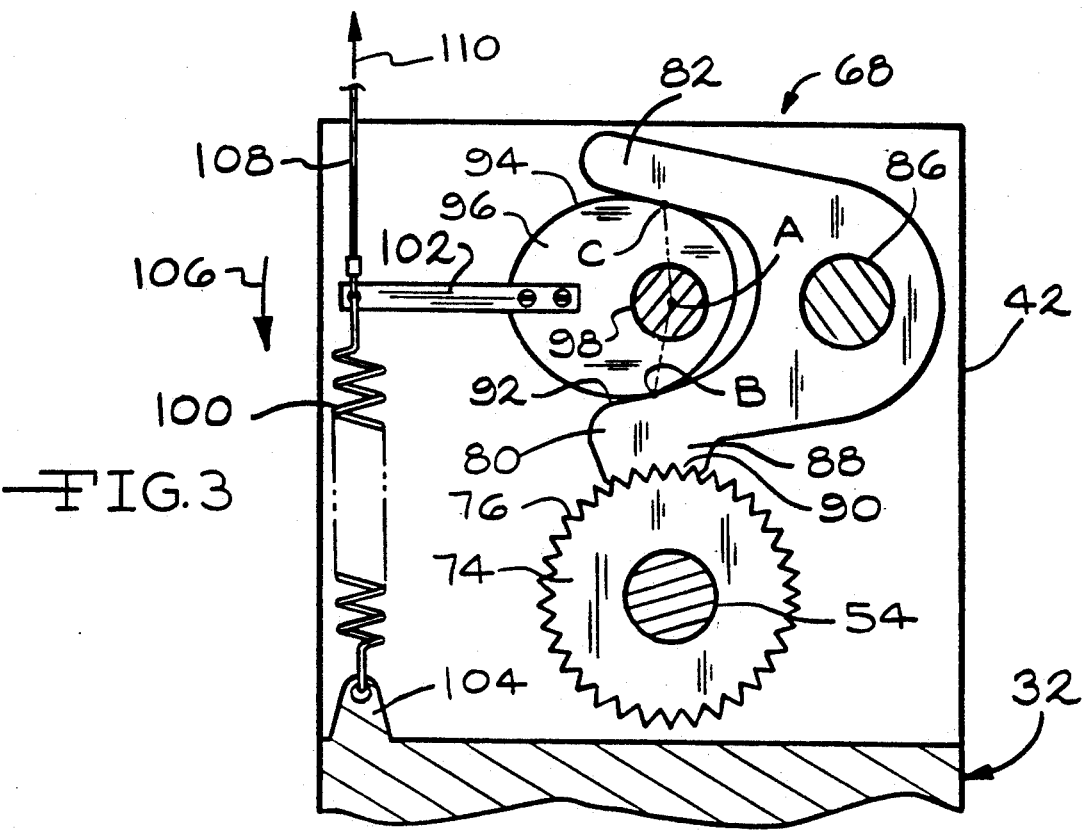
FIGS. 3 and 4 are sectional views as seen from substantially the line 3—3 showing the pawl in a locked position in FIG. 3 and in an unlocked position in FIG. 4.

The recliner mechanism of the present invention is shown within the seat assembly 10 of FIG. 1. Seat assembly 10 is of a conventional structure for a vehicle seat assembly having a base member 12 adapted to be attached to a vehicle floor pan. Slidably mounted upon the base member 12 is a seat frame 14 comprised of a slide rail 16 and a riser 18 The slide rail is mounted upon the base member 12 for sliding motion in a fore and aft direction to adjust the position of the seat assembly 10 within the motor vehicle. A seat adjuster mechanism for holding the slide rail in position on the base member is not shown. The riser 18 is mounted to the slide rail. A seat pan (not shown) for the seat cushion 20 is attached to the riser 18. A seat back 22 including a back frame 24 is mounted to the riser 18 for rotation about the pivot 26.

The base member 12, slide rail 16 and riser 18 all extend in a fore and aft direction along one side of the seat assembly. An identical structure (not shown) is provided at the opposite side of the seat assembly for supporting the seat cushion and seat back along the opposite side of the seat assembly.

A recliner mechanism 30 is provided to enable the angle of inclination of the seat back 22 to be adjusted a shown by the various positions of the back frame 24 in FIG. 1. Recliner mechanism 30 includes a mounting bracket 32 fixed to the seat frame 12. The mounting bracket 32 is shown as a one piece bracket having a front stanchion 34 and a rear stanchion 36 extending upwardly from a base portion 38. Alternatively, the front and rear stanchions could be separate elements attached separately to the seat frame 14. The front stanchion has a bore 40 extending forwardly into the stanchion from a rear surface 42. The rear stanchion has a bore 44 extending rearwardly therein from a front surface 46. The two bores 40 and 44 are aligned along a fore and aft extending axis 48. The two bores 40 and 44 each contain a journal bearing 50 and 52 respectively. The journal bearings mount a lead screw 54 therein for rotation about the axis 48. The lead screw 54 includes a helical screw thread 56 along its length between the two stanchions.

The back frame 24 includes a recliner arm 58 that extends downwardly below the pivot 26. A drive nut 60 is carried at the lower end of the recliner arm 58. The drive nut 60 includes a pair of pins 62 extending laterally therefrom (only one of which is shown) which extend through a slot 64 in the recliner arm. The recliner arm is forked, having a pair of legs 66, one on each side of the lead screw. Only one of the legs 66 is shown. The laterally extending pins 62 are each captured within a slot 64 in one of the legs 66.

The drive nut 60 includes an internal bore that is threaded with helical threads complementary to the external threads 56 of the lead screw. The helix angle of the threads is such that when an axial load is applied to the drive nut 60, the threads will cause rotation of the lead screw 54, causing the drive nut 60 to translate axially along the length of the lead screw. Such an axial load is applied to the drive nut 60 when a fore or aft force is applied to the seat back 22 as indicated by the arrow 68. The angle of inclination of the seat back 22 is correlated to the position of the drive nut 60 along the length of the lead screw 54.

Rotation of the lead screw 54 is selectively controlled by a lock mechanism 68 which is capable of locking the lead screw to prevent its rotation. This in turn locks the drive nut in place along the lead screw 54 which ultimately locks the seat back 22 in position. Upon selective release of the lock mechanism 68, the lead screw is permitted to rotate by axial forces applied by the drive nut 60 allowing the seat back angle to be adjusted.

The front stanchion 42 includes a vertical passage 70 extending downwardly into the stanchion from a top surface 72. The vertical passage 70 intersects the bore 40 and extends downwardly therebelow. A gear 74 is fixed to the lead screw 54, concentric about the axis 48 and is located within the passage 70. The gear 74 includes a plurality of axially extending locking teeth 76 about its periphery. Above the gear 76 is a U-shaped locking pawl 78. The locking pawl is rotatable about a pivot pin 86 and includes a locking leg 80 and a release leg 82 extending from a base portion of the pawl 84. The pivot pin 86 extends in a direction parallel to the lead screw axis 48 with the lock and release legs of the pawl extending laterally from the base portion.

The pawl lock leg 80 includes a toothed portion 88 having a plurality of downwardly projecting teeth 90 that extend axially along a lower edge surface of the lock leg 80. The pawl teeth 90 are engageable with the gear teeth 76 to lock gear 74 in place, preventing rotation of the gear and screw about the axis 48. The lock mechanism 68 is shown in a locked condition in FIG. 3.

The inner surface 92 of the lock leg and release leg of the pawl serves as a cam follower surface for engagement with the outer edge surface 94 of a cam 96. Cam 96 is a disk shaped cam having an irregular outer surface 94. The cam 96 is rotatably mounted to the stanchion 42 for rotation about a pivot pin 98 which is parallel to the pivot pin 86 and to the axis 48 of the lead screw.

The cam 96 is designed such that the cam surface 94 contacts the cam follower surface 92 of both the locking pawl and the release pawl at all times. The rotational position of the cam is biased by a spring 100. Spring 100 is mounted at one end to a lever 102 extending radially from the cam 96 and is anchored at the other end to the lower portion of the stanchion 42 at the mounting boss 104. The spring 100 rotates the cam 96 in a counterclockwise direction as viewed in FIGS. 3 and 4 as indicated by the arrow 106. The cam will rotate counterclockwise until the radial distance AB between the cam pivot axis and the contact point with the lock leg is large enough that the lock leg 80 of the pawl is forced into engagement with the gear 74. Counterclockwise rotation of the cam results in an increase in the distance AB. Once the lock leg engages the gear, further rotation of the cam is prevented. The counterclockwise rotation of the cam results in the decrease of the distance AC. AC is the distance between the cam pivot axis and the contact point with the release leg 82 of the cam.

Figure 4:
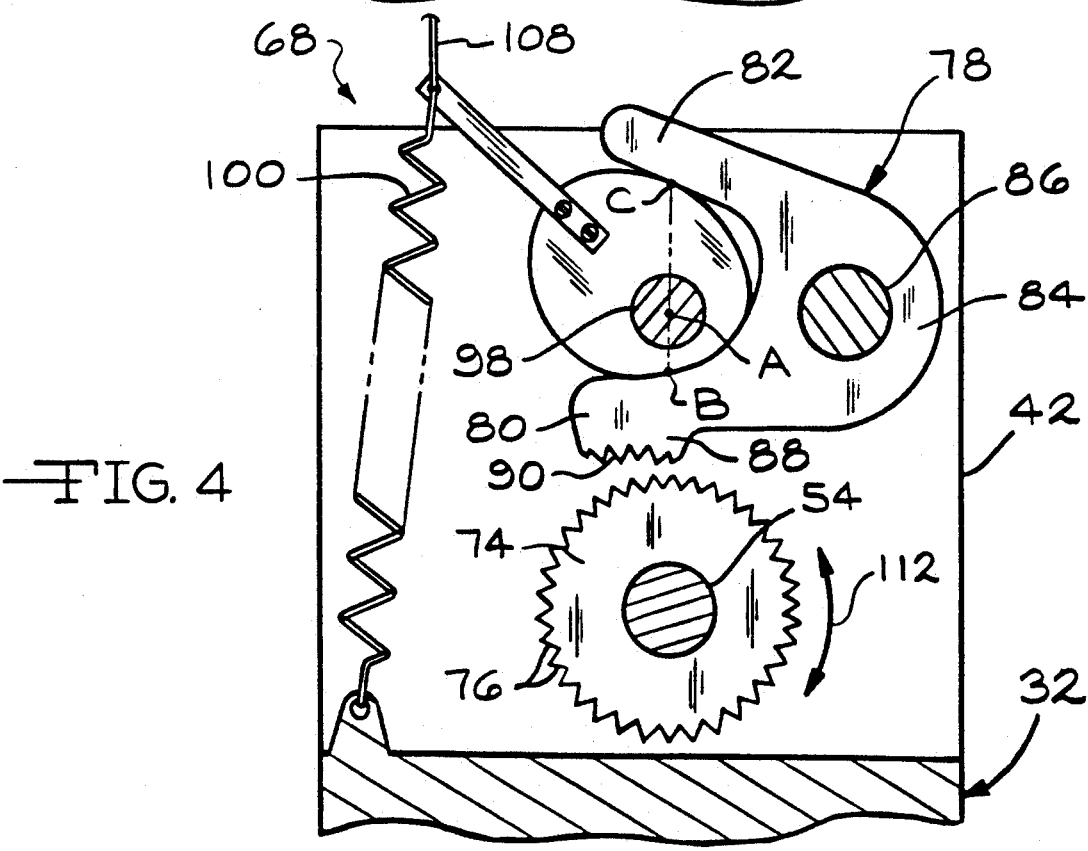

The lock mechanism 68 is released by clockwise rotation of the cam from its lock position of FIG. 3 to the release position of FIG. 4. This is accomplished by applying a tensile force in the pull wire 108 indicated by the arrow 110 in opposition to the spring 100. This is manually performed by a simple release lever, (not shown) commonly used in manually adjustable seat assemblies. As the cam rotates clockwise, the distance AB will decrease while the distance AC increases. The increasing distance AC applies an upward force on the release leg 82 causing the pawl to be rotated clockwise while at the same time the distance AB is shortened, allowing the lock leg 80 to be raised from the gear 74. This is shown in FIG. 4 where the pawl teeth 90 have been withdrawn from the gear teeth 76, now enabling the gear to rotate in either direction about the axis 48 as shown by the arrow 112. Upon release of the tension in the pull wire 108, the bias spring 100 will return the pawl to a locked position with the teeth 90 engaging the gear teeth 76.

The gear 74 also serves as a thrust disk to frictionally prevent rotation of the gear and lead screw during high loading arising from a vehicle collision. The bearing supports for the lead screw 54 in the front and rear stanchions permit axial movement of the lead screw during a high loading condition. The end of the lead screw contains a reduced diameter end portion 114 which is seated within the journal bearing 50. The shoulder 115 created by the diameter reduction is spaced from the journal bearing 50 so that axial movement of the screw is allowed.

The screw end portion 114 terminates in a rounded end 116 which could be a single ball mounted in a socket. The rounded end 116 contacts the center of a yieldable disk 118 that forms a bearing race. Positioned adjacent to the disk 118 is an annular bearing 120 comprising an annular array of bearing balls 122. The diameter of the circular array of bearing balls 122 is larger than the diameter of the screw end portion 114. As a result, there is no axial support at the center of the disk 118 adjacent the rounded end 116.

Adjacent the bearing 120 on the opposite side of the lead screw 54 is a second yieldable disk or bearing race 123. Finally, a set screw 124 is threadably mounted into the stanchion 42 for supporting the disk 122 opposite the bearing 120. An identical structure is used to mount the rear end of the lead screw 54 as shown in FIG. 1. The two set screws 124 are used to axially position the lead screw 54 such that the gear 74 is spaced equidistantly from the two side walls 128 and 130 of the passage 70 in the front stanchion 42.

Upon predetermined axial loading of the lead screw, the disks 118 and 123 at one end of the lead screw, depending upon the direction of loading, will be deformed by the rounded end 116 of the screw or set screw 124 to permit axial movement of the lead screw. Once the lead screw has moved sufficiently for one of the end faces 132 and 134 of the gear 74 to contact one of the side walls 128 and 130 respectively, the friction interface between the gear end wall and the passage side wall will provide a resistance to rotation of the gear and lead screw. The helix angle of the lead screw threads is such that the rotational torque applied to the lead screw is not sufficient to overcome the friction between the gear and the front stanchion side walls. As a result, the mechanism is self locking. The bearing races 118 and 122 can be made of a resilient material such that after the high axial load on the lead screw has been relieved, the lead screw would return to its normal position with the gear 74 positioned equidistantly from the two side walls of the passage 70.

The seat back recliner of the present invention is infinitely variable by virtue of the use of a threaded lead screw. In addition, the mechanism is made self locking during a loading condition to prevent release of the seat back.

It is to be understood that the invention is not limited to the exact construction illustrated and described above, but that various changes and modifications may be made without departing from the spirit and scope of the invention as defined in the following claims.

I claim:

1. A vehicle seat assembly comprising:
a fore and aft extending base part for attachment to a vehicle floor pan;
a fore and aft extending seat part mounted to said base part for fore and aft movement of said seat par relative to said base part;
a back part partially mounted to said seat part for rotation about a pivot axis, said back part including a recliner arm extending generally downwardly from said pivot axis;
means coupling said recliner arm to said seat part to hold said recliner arm and said back part in a fixed position relative to said seat part, said coupling means including an elongated lead screw having a longitudinal axis extending fore and aft, said lead screw being mounted to said seat part by bearing means at the ends of said screw for rotation of said screw about said longitudinal axis and said screw having a plurality of helical threads about the surface thereof;

a drive nut coupled to said recliner arm and having a threaded bore and being threaded onto said screw, said drive nut being longitudinally movable along said screw upon rotation of said screw to vary the rotational position of said recliner arm and said back part relative to said seat part;

a lock gear fixed to said screw for rotation therewith about said axis, with a circular periphery having a plurality of axially extending teeth on said periphery; and a locking pawl mounted to said seat part and having a plurality of teeth engageable with said teeth of said gear, said pawl being movable between lock position in which the teeth of said pawl engage the teeth of said gear to prevent rotation of said gear and a release position disengaged from said gear to permit rotation of said gear.

2. The seat assembly of claim 1 further comprising a cam rotatably mounted to said seat part about a cam pivot axis, said cam having a cam surface engaging said pawl to move said pawl between said lock and said release positions.

3. The seat assembly of claim 2 further comprising bias means coupled to said cam to rotate said cam to a position corresponding to the lock position of said pawl.

4. The seat assembly of claim 3 wherein said pawl is generally U-shaped with a pair of legs, a lock leg and a release leg, said lock leg containing a toothed portion containing the teeth of said pawl, said cam being disposed between said legs and engaging both said legs, said cam surface varying in radial distance from the pivot axis of said cam about the periphery of said cam;

bias means for rotating said cam to a position in which the radial distance between said cam pivot axis and said cam periphery contacting said pawl lock leg forces said pawl teeth into engagement with the teeth of said lock gear; and means for rotating said cam in opposition to said bias means to a position in which the radial distance between said cam pivot axis and said cam periphery contacting said release leg forces said cam to said release position thereby permitting rotation of said screw.

5. A vehicle seat assembly comprising:

a fore and aft extending base part for attachment to a vehicle floor pan;

a fore and aft extending seat part mounted to said base part for fore and aft movement of said seat part relative to said base part;

a back part pivotally mounted to said seat part for rotation about a pivot axis, said back part including a recliner arm extending generally downwardly from said pivot axis;

means coupling said recliner arm to said seat part to hold said recliner arm and said back part in a fixed position relative to said seat part, said coupling means including an elongated lead screw having a longitudinal axis extending fore and aft, said lead screw being mounted to said seat part by bearing means at the ends of said screw for rotation of said screw about said longitudinal axis and said screw having a plurality of helical threads about the surface thereof;

a drive nut coupled to said recliner arm and having a threaded bore and being threaded onto said screw, said drive nut being longitudinally movable along said screw upon rotation of said screw to vary the rotational position of said recliner arm and said back part relative to said seat part;

a lock gear fixed to said screw for rotation therewith, said lock gear having a circular periphery with a plurality of axially extending teeth on said periphery and said gear having a pair of axially spaced end faces;

means selectively engageable with said teeth for preventing rotation of said screw and selectively disengageable from said teeth for permitting rotation of said screw;

means forming a pair of wall surfaces fixed to said seat part in spaced confronting juxtaposition to said gear end faces; and means for permitting axial movement of said screw in response to axially loading of said screw above a predetermined value whereby one of said gear end faces is moved into contact with one of said wall surfaces to frictionally resist rotation of said gear and said screw.

6. The seat assembly of claim 5 wherein each end of said screw is formed with an end surface and each end of said screw is axially supported by a yieldable circular disk positioned normal to said screw axis and engaging said end surface, said disks having a diameter greater than said screw end surface; and annular support means adjacent to said disk for supporting only the outer peripheral portion of said disk whereby upon axially loading of said screw, said end surface deforms the center portion of said yieldable disk, said disk yielding upon the application of an axial force applied to said disk by said screw to permit said screw to move axially to engage an end wall of said gear with one of said wall surfaces.

7. The seat assembly of claim 5 further comprising means at each end of said lead screw for axially positioning said screw whereby said gear end faces are spaced equidistantly from said wall surfaces.

8. The seat assembly of claim 5 wherein said means for permitting axial movement of said screw includes, adjacent each screw end, a first yieldable disk having a diameter greater than said screw end, means opposite said screw end for axially supporting said first disk about an annular outer portion of said disk having a diameter greater than said screw end, a second yieldable disk adjacent said axial support means and a set screw threadably mounted to said seat part and axially supporting said second disk in the center thereof.

* * * * *

UNITED STATES PATENT AND TRADEMARK OFFICE
CERTIFICATE OF CORRECTION

PATENT NO. : 5,280,999
DATED : January 25, 1994
INVENTOR(S) : William H. Jones, Les Griswold It is certified that error appears in the above-indentified patent and that said Letters Patent is hereby corrected as shown below:

On the Title page, item [57],
In the Abstract, line 1, delete "rack" and insert in place thereof --back--.

In Column 4, line 58, Claim 1, after "seat", delete "par" and insert in place thereof --part--.

In Column 5, line 18, Claim 1, after "between", insert --a--.

In Column 2, line 10, delete "a" and insert in place thereof --as--.

Signed and Sealed this

Twenty-eighth Day of June, 1994

Attest:

BRUCE LEHMAN

*Attesting Officer*  *Commissioner of Patents and Trademarks*